US011796429B2

(12) United States Patent
Williamson, IV et al.

(10) Patent No.: US 11,796,429 B2
(45) Date of Patent: Oct. 24, 2023

(54) MICROTOME SECTIONABLE GEL SUPPORT STRUCTURE AND METHODS

(71) Applicants: BioPath Automation, L.L.C., Mahon, MA (US); Sakura Finetek U.S.A., Inc., Torrance, CA (US)

(72) Inventors: Warren P. Williamson, IV, Marion, MA (US); Richard W. Dapson, Richland, MI (US); Amit D. Shah, Rancho Palos Verdes, CA (US)

(73) Assignees: BIOPATH AUTOMATION, LLC, Marion, MA (US); SAKURA FINETEK U.S.A., INC., Torrance, CA (US)

( * ) Notice: Subject to any disclaimer, the term of this patent is extended or adjusted under 35 U.S.C. 154(b) by 456 days.

(21) Appl. No.: 17/015,813

(22) Filed: Sep. 9, 2020

(65) Prior Publication Data
US 2020/0408651 A1 Dec. 31, 2020

Related U.S. Application Data

(62) Division of application No. 14/011,809, filed on Aug. 28, 2013, now Pat. No. 10,794,804.

(60) Provisional application No. 61/700,062, filed on Sep. 12, 2012.

(51) Int. Cl.
*G01N 1/31* (2006.01)
*G01N 1/36* (2006.01)
*G01N 1/06* (2006.01)

(52) U.S. Cl.
CPC ............ *G01N 1/31* (2013.01); *G01N 1/36* (2013.01); *G01N 1/06* (2013.01); *G01N 2001/368* (2013.01)

(58) Field of Classification Search
CPC .... G01N 1/31; G01N 1/36; G01N 1/06; G01N 2001/368
See application file for complete search history.

(56) References Cited

U.S. PATENT DOCUMENTS

| 3,996,326 | A | * | 12/1976 | Schachet | ................. G01N 1/36 264/294 |
| 6,458,598 | B1 | | 10/2002 | Huang | |
| 7,156,814 | B1 | * | 1/2007 | Williamson, IV | .......................... A61B 10/0096 435/297.5 |

(Continued)

FOREIGN PATENT DOCUMENTS

NL 2005461 C2 4/2012

OTHER PUBLICATIONS

European Patent Office, European Search Report in EP Application No. 21179025.8 dated Aug. 19, 2021 (10 pages).

*Primary Examiner* — Sean C. Barron
(74) *Attorney, Agent, or Firm* — Rooney IP, LLC

(57) ABSTRACT

A sectionable tissue sample support structure including a gel compound formed into a self supporting geometric shape for retention and orientation of at least one tissue sample during a histopathology process including processing, embedding and microtome slicing of the tissue sample. A method of orienting, processing, embedding and microtome slicing a tissue sample using a gel compound preformed into a self supporting geometric shape. A combination including the sectionable tissue sample support structure and a package containing the sectionable tissue sample support structure.

6 Claims, 12 Drawing Sheets

(56) References Cited

U.S. PATENT DOCUMENTS 8,048,533 B2 * 11/2011 Kimura .................. B32B 27/00
428/326
2008/0254504 A1 * 10/2008 Vom ........................ G01N 1/44
435/40.52

* cited by examiner

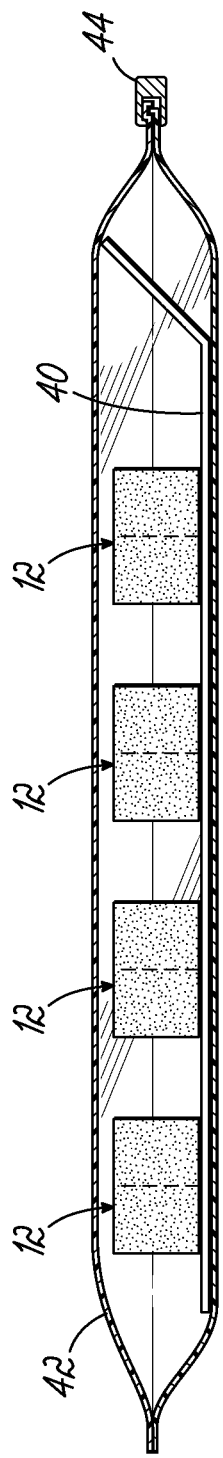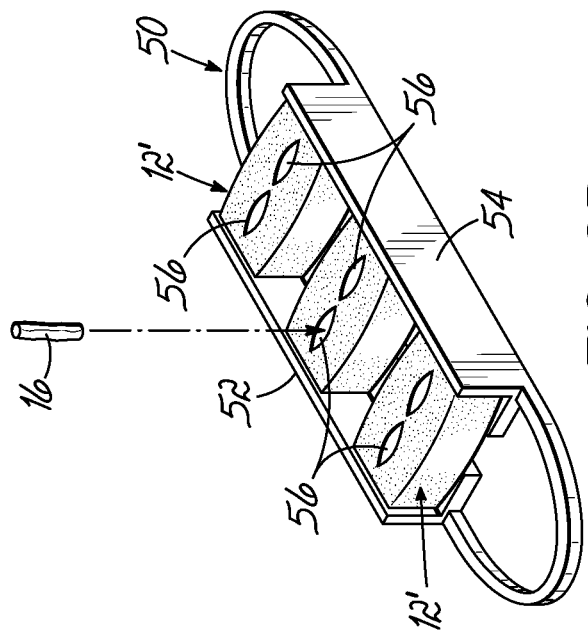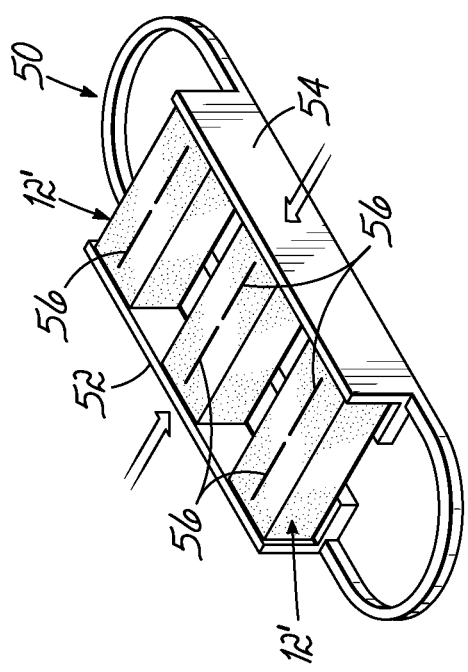

MICROTOME SECTIONABLE GEL SUPPORT STRUCTURE AND METHODS

CROSS-REFERENCE TO RELATED APPLICATION

This application is a divisional of application Ser. No. 14/011,809 filed Aug. 28, 2013 (pending), which claims the priority of Application Ser. No. 61/700,062 filed Sep. 12, 2012, the disclosure of which is hereby incorporated by reference herein.

TECHNICAL FIELD

The present invention relates generally to histopathology and, more specifically, to devices and methods related to the processing, embedding and microtome sectioning of biological tissue samples for purposes of scientific or medical examination.

BACKGROUND

Histopathology is the science of preparing tissue samples for microscopic examination by a pathologist. The ultimate purpose is to diagnose the medical condition of a patient from whom the tissue sample was taken. One or more tissue samples are treated in a processing step to remove fluid from the tissue samples and replace the fluid with media such as paraffin. The tissue samples are then embedded in media, typically paraffin, and formed into a block. The paraffin block together with the embedded tissue sample(s) is sliced into very thin sections which are then adhered to a glass microscope slide. The tissue sections are stained and prepared for microscopic examination by a pathologist.

One of the most crucial steps in the process is to properly orient the tissue samples in relation to the sectioning plane during the paraffin embedding process. Large sections of organs or tumors may or may not have specific orientation requirements when embedded in the paraffin block. However, most tissue samples have some requirement for orientation. Techniques or products have become available to help the histotechnologist obtain the proper orientation of the tissue sample in an efficient manner. Gels are available to assist with orientation, however, these are typically two-part gels which need to be mixed or fixing gels which either need to be cooled or activated to then hold the tissue in the proper orientation. Therefore, these uses of gel require additional time and special techniques to obtain a desired tissue orientation. In addition, modern techniques such as those described in U.S. Pat. Nos. 7,156,814; 7,722,810; 7,776,274; and 8,034,292 and 8,383,067, (the disclosures of which are hereby fully incorporated by reference herein), are examples of efforts to accommodate specific types of tissue samples and their need for orientation. Some tissue types are much more difficult to embed properly than others. This is especially true for small tissue fragments. Automation of the histopathology process provides further challenges because manual embedding methods for such small tissue samples cannot keep pace with the throughput of the laboratory.

Histopathology laboratories, like all businesses, are under pressure to become more cost effective while maintaining high quality and shorter turnaround times for pathology reports. Tissue sizes and shapes with correspondingly intricate and unique orientation requirements make it very difficult to meet these demands. Even within advanced automated processes some tissue types continue to need extra care and attention for proper embedding. Until automation of the paraffin embedding and microtome sectioning process these steps were largely carried out in manual steps by trained histotechologists. While some examples of "embedding aids" are noted in the prior art, all fall short of addressing this need at least for a certain subset of tissue types. For example, there are very small tissue samples that are routinely examined by histopathology process. These samples can be so small that manipulation with forceps is difficult and orientation is extremely difficult. To compound this problem the samples are sometimes so small that special types of cassettes are needed to be certain that the tissue samples do not escape from their tissue processing cassettes.

Small thread-like strands or indiscriminate chips or scrapings from a biopsy procedure are particularly difficult to maintain in proper orientation during the embedding process. Therefore, in histopathology there are tissue types and procedures which require special handling and embedding technique due to their size and orientation requirements. These procedures slow down the workflow, and are subject to a poor quality outcome. In addition to human pathology, the histopathology is used to diagnose disease in non-human species. For instance, pharmaceutical companies commonly use rodent models to detect drug interaction or side effects prior to any testing on humans. One rodent model commonly used is a mouse. Genetic engineering has allowed companies to design mice which are very sensitive to certain types of disease, therefore speeding up drug development. These companies routinely use the mouse model to observe drug effects, prior to proceeding to costly trials. Histopathology confirms the effects of the drugs through examination of affected tissue types. Hundreds of thousands of mice are studied every year. An example of one such structure is the central nervous system. Limbic, brain stem, spinal cord and optic nerve tissue are most indicative of abnormal growth or pathology for some drugs. As one can imagine, some nerve threads from a mouse are exceedingly small. One structure in particular, the optic nerve, is ½ mm in diameter and less than two mm long. It is a significant challenge to hold tiny tissue samples upright in a droplet of paraffin while the droplet cools and solidifies, or while a two-part gel solidifies around the optic nerve tissue sample. Often times, when trying to release the tissue sample, the sample sticks to the forceps instead of the embedding media. This is a tedious process that requires extreme dexterity, training and experience to obtain consistent, high quality results. This coupled with the need to work efficiently has created a need for a small tissue holder that provides significant advantages to those in the field.

SUMMARY

In one embodiment, a sectionable tissue sample support structure comprises a gel compound formed into a self supporting, three dimensional geometric shape for retention and orientation of at least one tissue sample during a histopathology process which includes processing, embedding and microtome slicing of the tissue sample. The tissue sample support structure may have one or more additional features as described herein, with examples summarized below.

The gel compound may be resilient such that after deformation from an original shape, the gel compound reverts back to the original shape. This can assist with various uses, such as tissue sample retention. The sectionable tissue sample support structure can further comprise a tissue sample receiving space formed into the gel compound for retaining the tissue sample during the histopathologic process. As examples, the receiving space may comprise at least one of: a slit, a hole, a recess, or combinations thereof. The sectionable tissue sample support structure can further comprise a tissue retaining structure configured to retain the tissue sample in the tissue receiving space. For example, the tissue retaining structure can take the form of at least one deformable portion of the gel compound configured to apply a force to the tissue sample and thereby retain the tissue sample in a desired orientation. Various structures, such as jaws or flaps of the gel structure, may be used as the retaining structure. The deformable portion can be a hinged jaw element configured to move between open and closed positions and apply a clamping force to the tissue sample in the closed position to thereby maintain the tissue sample in a desired orientation. The two portions of the gel compound that receive the tissue therebetween may be on the same integral piece of preformed gel or may be two separate pieces, for example, that sandwich one or more tissue samples therebetween. The receiving space may be defined between flat or planar surfaces of the preformed gel, or may include one or more three dimensional spaces, such as grooves, slots or recesses in the preformed gel structure that hold the tissue sample(s). The gel compound is permeable to fluids and reagents used in processing the tissue sample. This aspect of the gel compound ensures that full cross-sectional preservation of the tissue sample is achieved during tissue processing with conventional fluids and reagents. A prepackaged sectionable tissue sample support structure comprises a gel compound as set forth in any of the description herein and a package enclosing the gel compound. The packaging may provide clean or even sterile conditions for the gel compound, and also at least assist with retaining moisture within the gel compound to maintain resiliency of the gel structure. The package may contain a suitable solution for purposes of maintaining resiliency of the gel compound. The gel compound and/or package may contain additives for preventing growth of mold, fungus or bacteria, for example. Alternatively, or in addition, the package may be subjected to various other types of non-contact sterilization, such as electron beam or gamma radiation.

The invention further provides methods for orienting, processing, embedding and microtome slicing a tissue sample using a gel compound preformed into a self supporting geometric shape. For example, one method comprises retaining the tissue sample in a desired orientation between first and second portions of the preformed, geometrically shaped gel compound. The tissue is processed while in the desired orientation by subjecting the tissue sample and the preformed, geometrically shaped gel compound to processing fluids and reagents. The preformed, geometrically shaped gel compound and the tissue sample are embedded in an embedding media while in the desired orientation to form a microtome sectionable block of the embedding media, the tissue sample and the preformed, geometrically shaped gel compound. The microtome sectionable block is then sectioned to obtain thin sections of the tissue sample for diagnosis.

Another method comprises adhesively retaining the tissue sample in a desired orientation on the preformed, geometrically shaped gel compound. The tissue is processed while in the desired orientation by subjecting the tissue sample and the preformed, geometrically shaped gel compound to processing fluids and reagents. The preformed, geometrically shaped gel compound and the tissue sample are embedded in an embedding media while in the desired orientation to form a microtome sectionable block of the embedding media, the tissue sample and the preformed, geometrically shaped gel compound. The microtome sectionable block is then sectioned to obtain thin sections of the tissue sample for diagnosis.

The methods of the invention may have various other aspects or steps. For example, the method can further comprise removing the preformed, geometrically shaped gel compound from a package prior to suitably securing the tissue sample to the preformed, geometrically shaped gel compound. Retaining the tissue sample between the first and second portions can further comprise retaining the tissue sample between resiliently deformable portions of the preformed, geometrically shaped gel compound. The first and second portions may be on the same three dimensional gel structure, such as the portions on either side of a tissue receiving slit for example, or each may comprise separate gel structures, such as two gel sheets between which the tissue sample is placed. Retaining the tissue sample between the first and second portions can further comprise retaining the tissue sample in a hole or recess formed in the preformed, geometrically shaped gel compound. The recess may, for example, be an elongate recess formed lengthwise along an outer surface of the preformed, geometrically shaped gel compound. The method may further include securing the preformed, geometrically shaped gel compound and the retained tissue sample on a tissue support structure at least prior to the embedding and microtome sectioning steps. The tissue support structure can further comprise a microtome sectionable support structure, such as a cassette.

The invention provides various advantages and features that address the complications or challenges associated with current tissue sample processing and embedding techniques. For example, the inventive gel compound, which is formed into a self-supporting geometric shape, can be preformed into any shape or configuration to facilitate specific embedding tissues or challenges. The compound can allow tissue samples to be held fast in a desired orientation and to hold the tissue sample or samples throughout tissue processing, embedding and sectioning procedures. The tissue sample is not lost during the processing techniques and is held securely and oriented precisely for subsequent embedding and sectioning without further manual or automated handling of the tissue sample itself. The tissue may be held in the desired orientation during positioning by the user and this includes disengagement of forceps from the tissue sample while the tissue sample is engaged with the gel compound. The tissue sample may be quickly and easily engaged and retained by the preformed gel compound with standard tools or implements and requires no mixing, drying, cooling or other activation of the compound during the orientation procedure.

As mentioned above, the gel compound allows processing of the tissue sample as the tissue sample is held and retained in the desired orientation. Thus, the compound is porous to fluids and reagents used to process the tissue sample. The gel compound does not interfere with the diagnostic process and, for example, if the gel compound absorbs or otherwise takes up the stain used on the microscope slide sections, the gel compound is distinguishable from the surrounding tissue sample. Preferably, the gel compound does not absorb the stain and, therefore, the gel compound is nondistracting to the user during the diagnostic process associated with the microscope slide holding one of the ribbon sections formed with the microtome. The three dimensional, preformed gel compound, does not interfere with microtome sectioning of very thin sections of the embedding material, the gel compound, and the tissue sample. Therefore, high quality, very thin ribbons may be sectioned and placed on glass microscope slides for diagnostic purposes. The three dimensional, preformed gel compound can serve to encapsulate and trap tissue during tissue processing with chemical fluids and reagents, as well as during embedding, sectioning and microscope slide preparation. As a result, tissue is not lost during these procedures. In addition, the invention results in little or no artifact being introduced into the tissue sample(s), which could interfere with proper microscope slide preparation and diagnoses of the tissue sample(s). Finally, the sectionable tissue sample support structures, including the preformed gel compounds, may be used in conjunction with automated sectionable cassettes to speed the overall histologic procedure.

The gel compound may be manufactured into any number of physical configurations based, for example, upon the needs of the pathologist or scientist, or based on the needs of the specific pathologic/scientific procedure being performed. The gel compound may be supplied in bulk form for the histotechnologist to make the desired tissue sample support structures. For example, the gel compound of this invention may be either extruded or cast into a sheet form, and then cut into appropriately sized sections for the intended application. For example, the preformed, three dimensional gel compound may be used in the form of small blocks of any desired shape, or small sheets. In the case of sheet forms, the tissue sample(s) may be sandwiched between two of the sheets, or between one of the sheets and another element, such as another type of sectionable support. Various features may be incorporated into the preformed, three dimensional gel compound to assist with its use during the different procedures involved in histopathology. As another example, physical features such as recesses or grooves may be formed in one or more surfaces of the three dimensional gel compound for express of fluid or fluid run-off as the tissue sample is place on or secured to the gel compound.

Various additional features and advantages will become readily apparent to those of ordinary skill in the art upon review of the following detailed description of the illustrative embodiments, taken in conjunction with the accompanying drawings.

BRIEF DESCRIPTION OF THE DRAWINGS

FIG. 8 is a cross sectional view of the packaged tissue sample support structures shown in FIG. 7.

FIG. 9A is a perspective view of three sectionable tissue sample support structures formed in accordance with another illustrative embodiment, and contained in a device for allowing tissue sample support recesses or slots to be opened and closed.

FIG. 9B is a perspective view similar to FIG. 9A, but illustrating the device being used to open the recesses or slots for receipt of tissue samples therein.

DETAILED DESCRIPTION

FIGS. 1-6 illustrate one of many possible forms for a sectionable tissue sample support structure constructed in accordance with the inventive concepts, and including a gel compound formed into a self-supporting geometric shape. Throughout this specification, the term "block" may be used to describe various types of tissue sample support structures constructed with a gel compound and preformed into a geometric shape, but this term is not meant to be limited to any particular three dimensional geometric shape. Instead, the gel compound blocks may have any shape, including the square or rectangular shapes shown, or blocks of any other curved, spherical, oblong or other shapes.

As used herein, a "gel compound" is defined as a dilute cross-linked system, which exhibits no flow when in the steady-state, and includes hydrogels, organogels, and/or aerogels. The gel compounds are mostly fluid, yet they behave like solids due to a three-dimensional cross-linked network within the fluid. It is the crosslinkages within internal components that give a gel compound its three-dimensional structure. In this way gel compounds are a dispersion of molecules of a fluid within a solid in which the solid is the continuous phase and the fluid is the dispersed phase.

Figure 1:
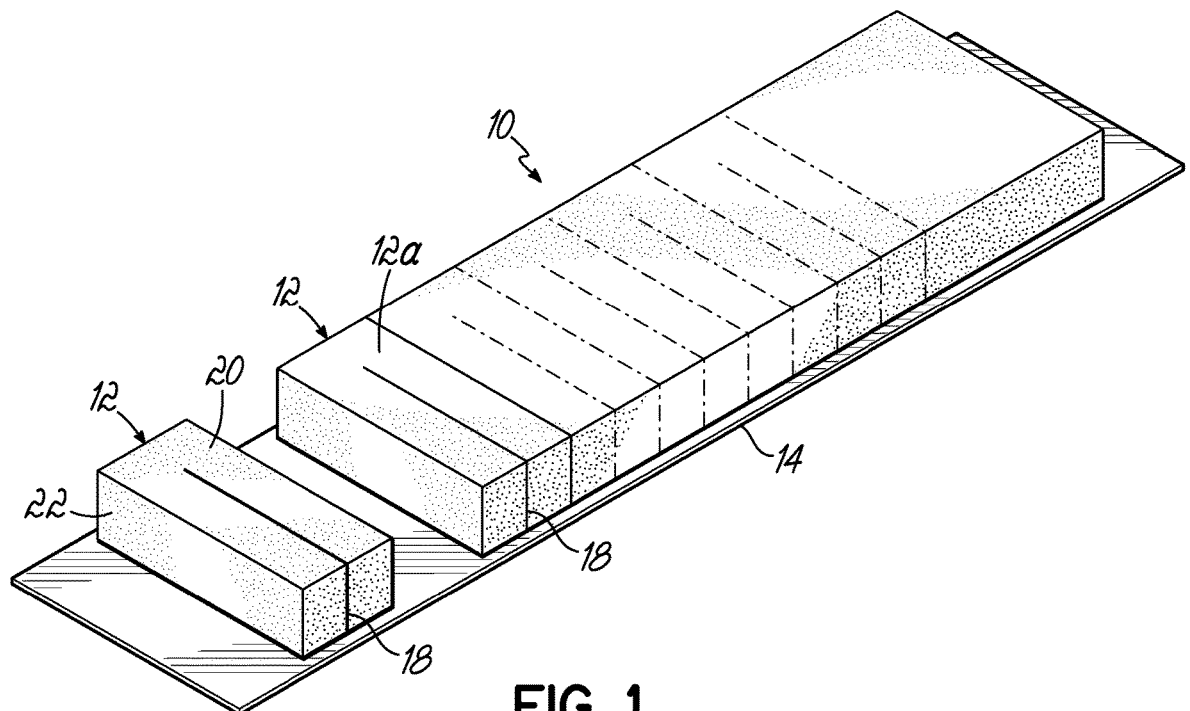
FIG. 1 is a perspective view of several preformed, sectionable tissue sample support structures constructed in accordance with a first illustrative embodiment of the invention.
Figure 2:
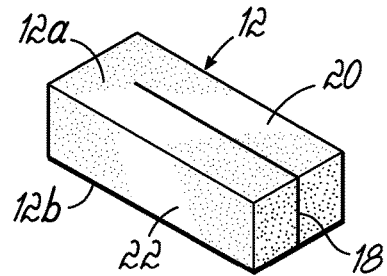
FIG. 2 is a perspective view of a single sectionable tissue sample support structure taken from FIG. 1.
Figure 3:
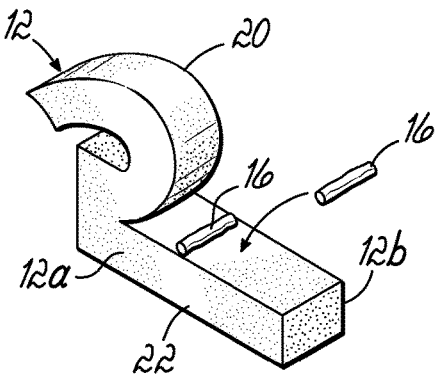
FIG. 3 is a perspective view illustrating the sectionable tissue sample support structure deformed or opened to receive tissue samples in a receiving space.
Figure 4:
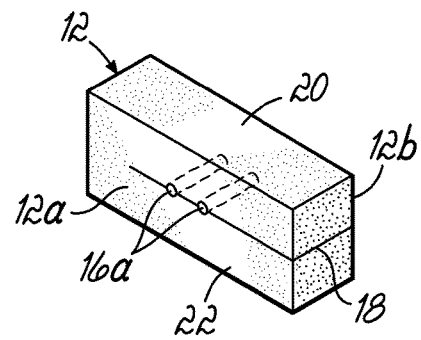
FIG. 4 is a perspective view illustrating the gel support structure of FIG. 3 in a closed condition for securing the tissue samples in the receiving space or slit of the gel support structure.

FIG. 1 illustrates a sheet 10 of extruded or cast gel compound formed, for example, to be 1.5 mm thick, 4 mm wide by 5 mm long. Individual sectionable tissue sample support structures or blocks 12 are formed and each may have a dimension of 1.5 mm thick, 4 mm long, and 3 mm wide. These dimensions are merely illustrative and may be changed in accordance with the needs of the user. The blocks 12 may be initially retained on a release paper or plastic tray 14, which may be part of a package to be described below, and, as shown in FIG. 3, thin, thread-like tissue samples 16 are retained in a tissue receiving space shown here as a slit 18 between two portions 20, 22 of the block 12. One portion 20 of the block 12 may be folded back or opened as shown in FIG. 3, and then closed as shown in FIG. 4 to secure the tissue sample 16 in the desired orientation. The gel compound is resilient or elastic in nature such that the opened portion 20 of the block 12 shown in FIG. 3 resiliently closes against the opposite portion 22 to the retain the tissue sample(s) 16 between the two portions 20, 22. Alternatively, if the gel block 12 does not have sufficient elasticity or resilience, an adhesive compound or other means may be used to retain the two portions 20, 22 in the closed position as shown in FIG. 4. It will be appreciated that the tissue samples 16 are retained within the tissue receiving space (i.e., a slit 18 in this embodiment), and the ends 16a of the tissue samples 16 are flush against the other surface 12a of the block 12. In this manner, the ends 16a of the tissue samples 16 will be positioned and oriented correctly for embedding and microtome sectioning procedures, as described below. In this regard, the outer surface 12a adjacent to which the tissue sample is exposed will face the sectioning plane such that as sections are taken with a microtome blade, the sections will include thin cross sections at, and then inward of, the tissue sample ends 16a.

Figure 5:
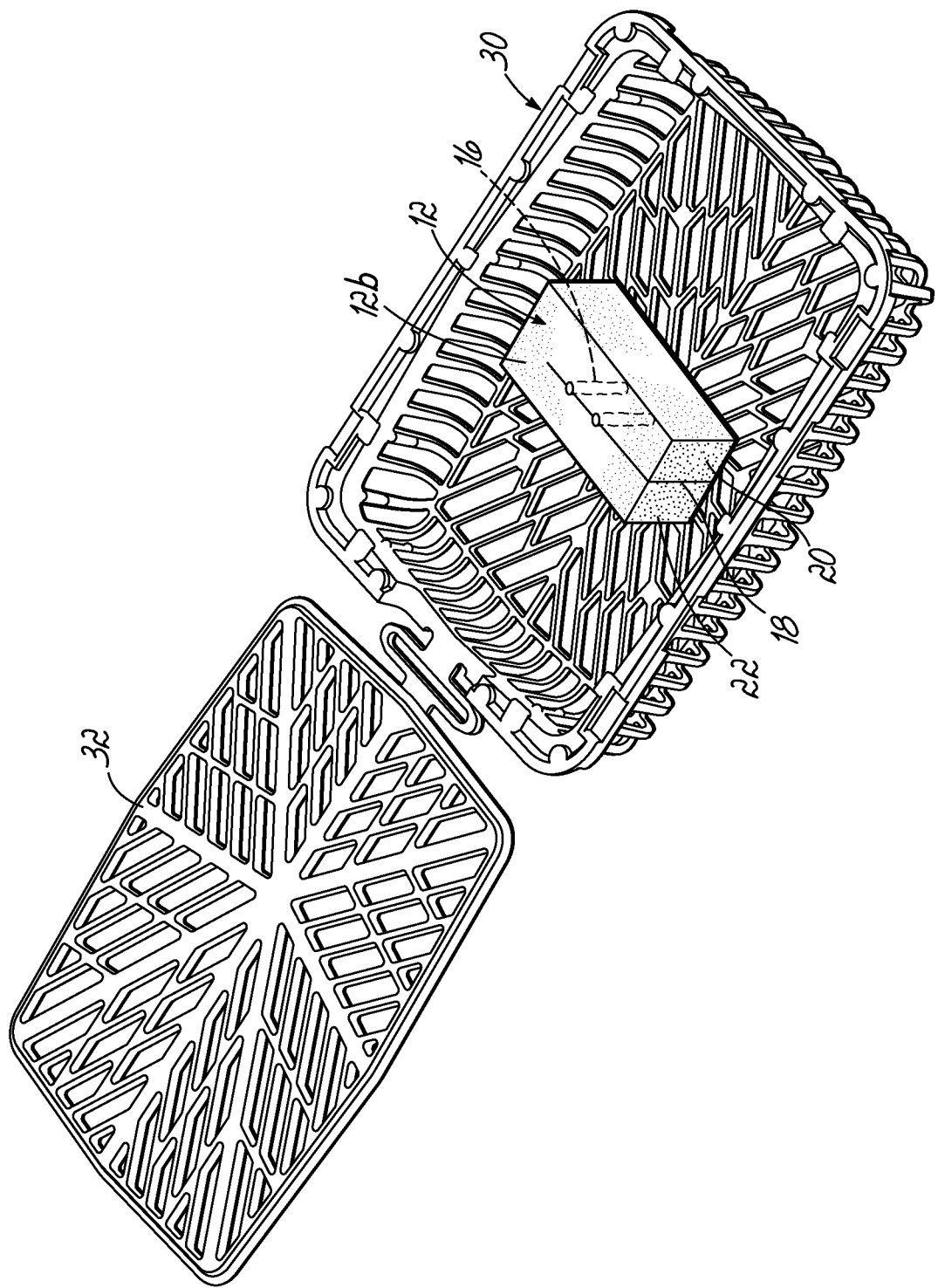
FIG. 5 is a perspective view illustrating the support structure of FIG. 4 placed in a sectionable cassette, with the lid of the cassette in an open condition.
Figure 6:
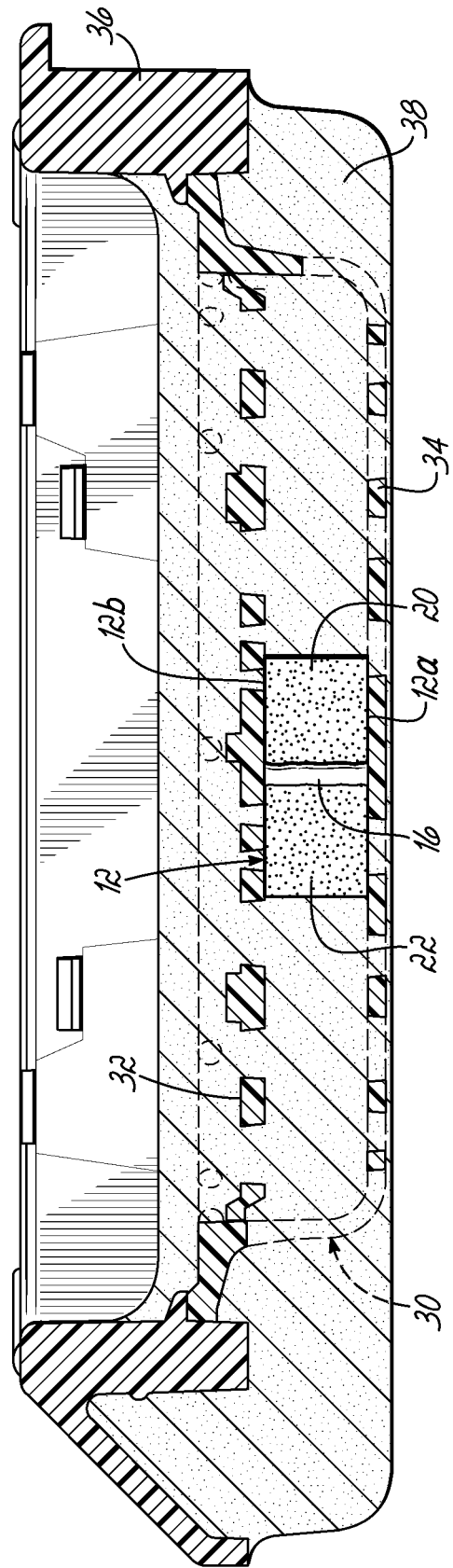
FIG. 6 is a cross sectional view illustrating the cassette of FIG. 5 in a closed condition and embedded in a block of paraffin, as well as coupled to a frame in preparation for a microtome sectioning operation.

One manner of processing, embedding and microtome sectioning of the tissue sample will be understood from a review of FIGS. 5 and 6. In these figures, a cassette 30 is used as described, for example, in U.S. Pat. No. 5,817,032 (the '032 patent), or the other patents and published application incorporated by reference above. As the procedure will be fully understood by reference to the '032 patent, as well as the other patents and published application incorporated by reference herein, additional disclosure is not necessary except to the extent appropriate for an understanding of the present invention. As shown in FIG. 5, the gel block 12 with the tissue samples 16 retained therein is placed into the sectionable cassette 30. The lid 32 of the cassette 30 is then closed against one surface 12b of the gel block 12 while the bottom 34 of the cassette 30 engages the opposite surface 12a of the gel block 12, as best illustrated in FIG. 6. Both the gel block 12 and the tissue samples 16 are retained in the cassette 30 during processing of the tissue samples 16 which involves submerging of the sectionable cassette 30, gel block 12, and the retained tissue samples 16 in various fluids and reagents designed to extract the bodily fluids from the tissue samples 16 and replace those fluids with, for example, paraffin. After processing, the sectionable cassette 30, and the gel block 12 with the retained tissue samples 16 secured within the cassette 30 or otherwise secured to a suitable support, is secured within a frame 36 in the position shown in FIG. 6, and the frame/cassette assembly is placed into a mold (not shown). Embedded material, such as paraffin, is then directed into the mold through the frame 36 and the perforate cassette 30 such that the paraffin takes the form of mold and solidifies into a paraffin block 38 as shown in FIG. 6. Microtome sections are then taken by a microtome blade operated by a histotechnologist, as generally described in the '032 patent, by facing off the bottom 34 of the cassette 30 until the tissue sample 16 is reached. At this point, very thin ribbon-like sections will be taken of the paraffin block 38, the gel block 12 and the tissue samples 16. Those ribbons (not shown) are then placed on glass microscope slides (not shown) for examination and diagnostic purposes.

Figure 7:
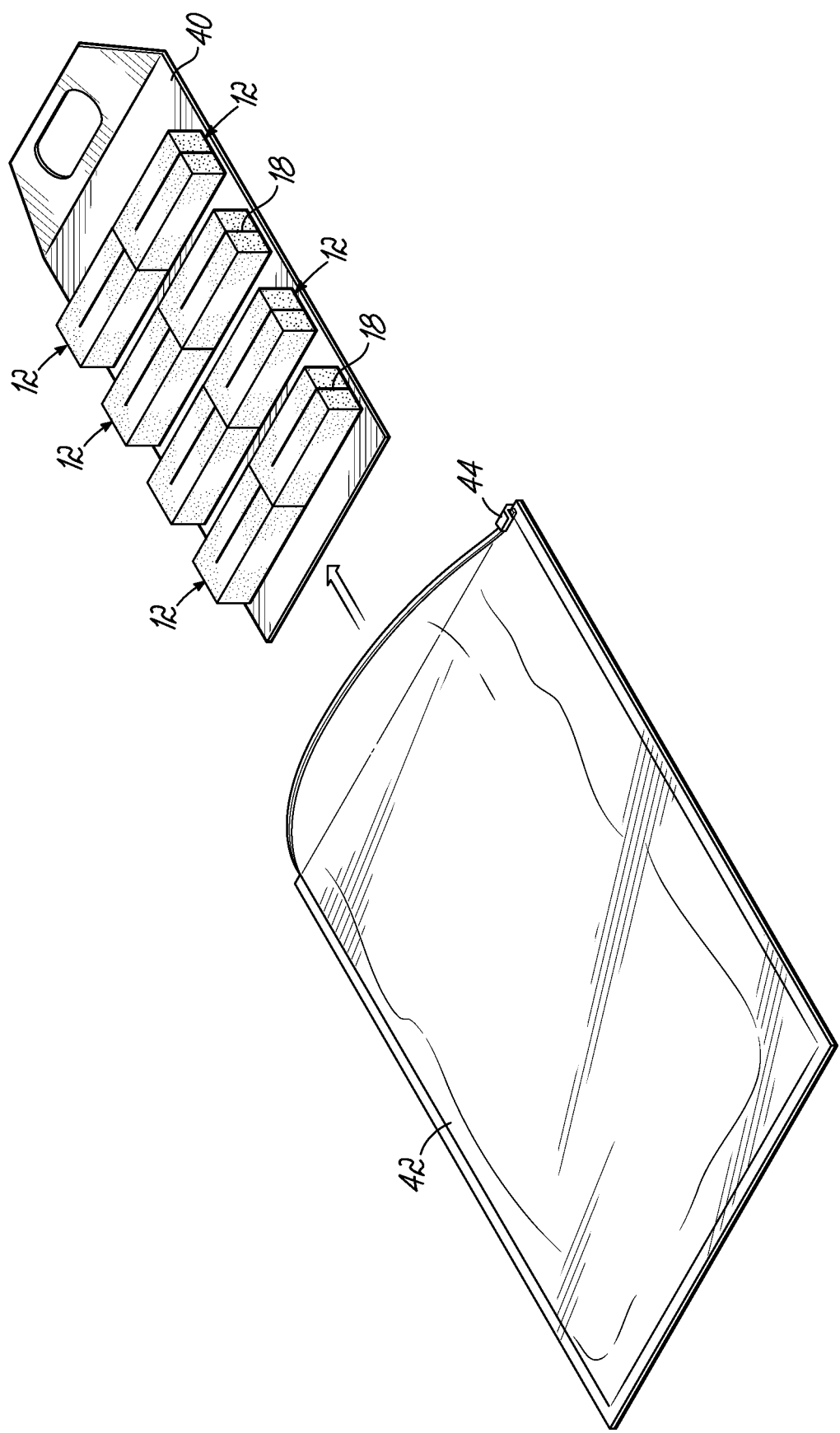
FIG. 7 is a perspective view illustrating an illustrative embodiment of a packaging system for the sectionable tissue sample support structure of FIG. 2.

FIGS. 7 and 8 illustrate one method and form of packaging the gel blocks 12 shown in FIGS. 1-4. In this example, the gel blocks 12 are placed onto a suitable support, such as a plastic tray 40, or wax coated paper or cardboard, and placed into a package which may take the form of a bag 42 having a suitable fastening means such as a slide connection 44 for sealing the bag but allowing resealing as well. The bag 42 may be sealed in a clean or even sterilized condition and preferably holds the gel blocks under moisture proof or at least moisture resistant conditions until use. Before sealing the bag 42, moisture may be added in any suitable manner for purposes of maintaining resilience of the gel blocks 12 during transport and storage. Additives may also include anti-fungal, anti-mold and/or anti-bacterial compounds. The user can remove the gel blocks 12 by sliding the paper or cardboard tray 40 out from the bag 42 and peeling the gel blocks 12 off of the paper or cardboard 40. The gel blocks 12 have a tackiness that is inherent and allows them to be adhered to the paper or cardboard 40 but easily peeled off for use.

FIGS. 9A and 9B illustrate a device 50 that may or may not be part of a packaging structure for the gel blocks 12'. The device 50 has sidewalls 52, 54 which removably retain the gel blocks 12' therebetween. The sidewalls 52, 54 may be compressed or squeezed together as schematically illustrated in FIGS. 9A and 9B. This opens respective slits 56 in each gel block 12' such that small pieces of tissue, such as threadlike tissue samples 16 may be easily inserted in a vertical manner within each open slit 56. Thus, the tissue samples 16 will be retained within the tissue receiving spaces or slits 56 of the gel blocks 12' substantially as shown and described with regard to FIGS. 3-6. Once the tissue samples 16 are placed and retained into the slits 56, the gel blocks 12' may be removed from the device 50 and used in accordance with the above description, for example, regarding FIGS. 5 and 6.

Figure 11:
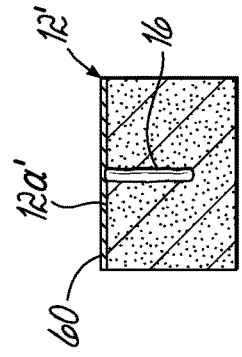
FIG. 11 is a cross sectional view taken through the sectionable tissue sample support structure of FIG. 10 to illustrate the adhesive containment layer used to seal and contain the tissue sample in place.
Figure 10:
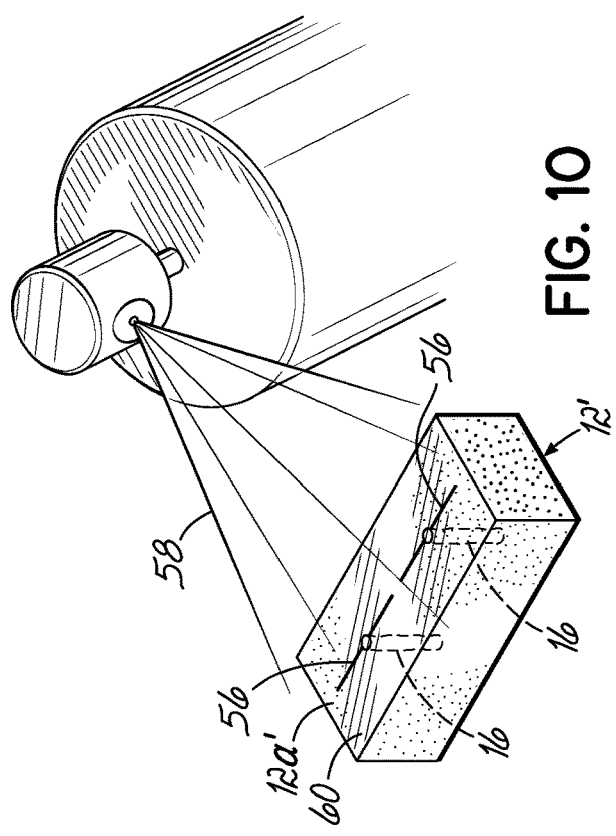
FIG. 10 is a perspective view illustrating the sectionable tissue sample support structures of FIGS. 9A and 9B receiving an adhesive containment spray to further retain, seal and/or contain the tissue samples therein.
Figure 12:
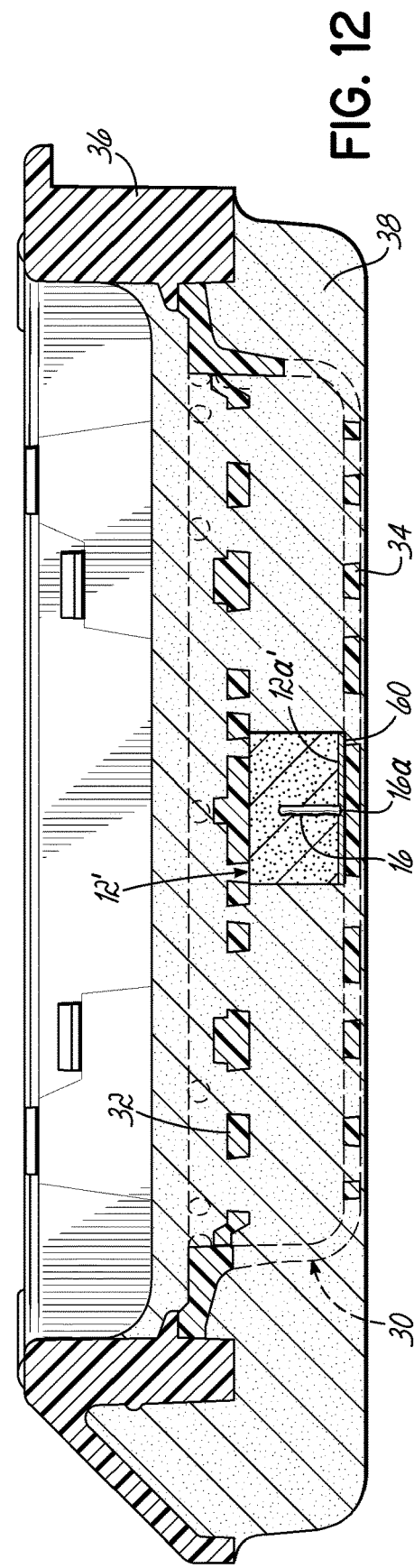
FIG. 12 is a cross sectional view similar to FIG. 6, but illustrating use of the sectionable tissue sample support structure of FIG. 11.

Alternatively, the gel blocks 12' may be removed from the device 50 and the surface 12a' of the gel block 12' that contains the slits 56 may be sprayed with an adhesive or other coating material for purposes of further retaining the tissue samples 16 within the gel block 12'. As shown in FIGS. 10 and 11, this sprayed coating of material 58 may be used to create an adhesive or coating layer 60 retaining the tissue sample 16 within the gel block 12'. This sprayed material may, for example, take the form of a spray form of the gel itself or any suitable adhesive such a polyvinyl acetate (PVA), ethylvinyl acetate (EVA) or cyanoacrylate (CA) adhesives and should generally have the same properties as the gel material forming the block 12' such as, for example, porosity, stain resistance, etc., as discussed above. As further shown in FIG. 12, the gel block 12' is placed into a cassette 30 generally as described above in connection with FIG. 6, such that the adhesive or other coating layer 60 faces the sectioning plane, defined by the bottom surface or wall 34 of the cassette 30, and the tissue sample end 16a also faces the sectioning plane. In this manner, after the bottom 34 of the cassette 30 is sectioned or faced off, the microtome will begin sectioning the paraffin block 38 and the gel block 12', in addition to the tissue sample 16, as described above.

Figure 13:
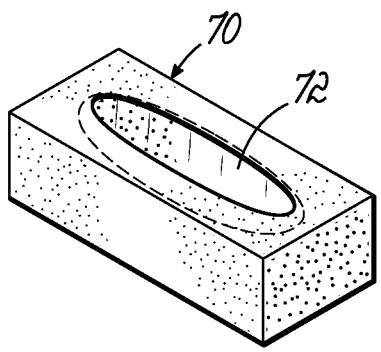
FIGS. 13-16 are additional illustrative embodiments of tissue sample support structures constructed in accordance with further embodiments.
Figure 14:
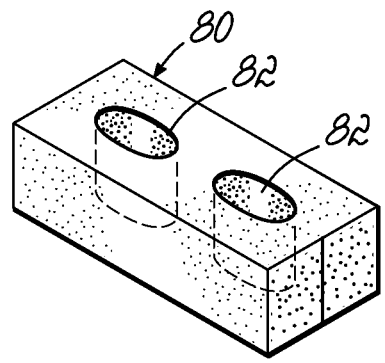
Figure 15:
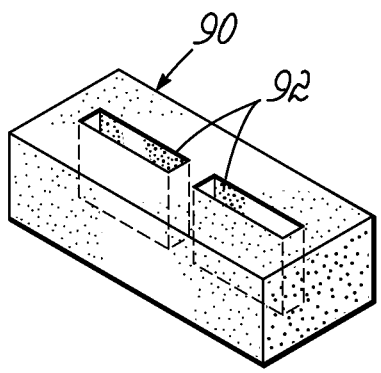
Figure 16:
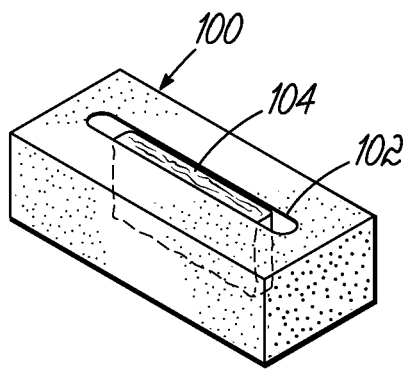

FIGS. 13-16 illustrate various other configurations of gel blocks, constructed with a compound having the formulations and properties as described herein, but having tissue receiving spaces of various forms. FIG. 13 illustrates a gel block 70 with a tissue receiving space 72 in the form of an oblong, elongate recess, while FIG. 14 illustrates a gel block 80 with a pair of oblong holes or recesses 82 for receiving and retaining tissue samples 16. FIG. 15 illustrates a gel block 90 with two elongate square shaped recesses 92, while FIG. 16 illustrates a gel block 100 with a single elongate recess 102, for example, holding a flat piece of tissue 104 such as skin tissue oriented on edge relative to the microtome sectioning plane.

Figure 17A:
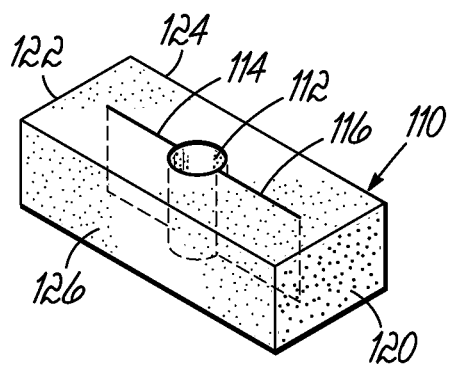
FIG. 17A is another illustrative embodiment of a sectionable tissue sample support structure having a receiving space in the form of a hole communicating with respective slits.
Figure 17B:
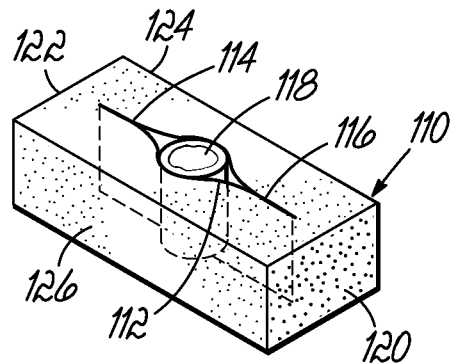
FIG. 17B is a perspective view of the support structure of FIG. 17A, but with a tissue sample contained in the hole.

FIGS. 17A and 17B illustrate another gel block 110 with an alternative tissue receiving space in the form of a central hole 112 and slits 114, 116 extending from opposite sides of the hole 112. This hole 112 is configured to hold a cylindrical piece of tissue, such as a tubular piece of tissue 118 as shown in FIG. 17B. For this purpose, the opposite ends 120, 122 of the gel block 110 may be squeezed or compressed together to widen the hole 112, with the assistance of the slits 114, 116, and the tubular piece of tissue 118 may then be placed in the hole 112. Due to the resilience or elasticity of the gel block 110, the opposite sides 124, 126 of the gel block 110 will move back together toward the original position and thereby compress or hold the tubular tissue sample 118 in the desired orientation shown in FIG. 17B. The gel blocks illustrated in FIGS. 13-16, as well as that of FIGS. 17A and 17B, are used in the same manner as described above, by sectioning along a plane defined by the surface of each block that exposes the tissue sample to the microtome blade.

Figure 18:
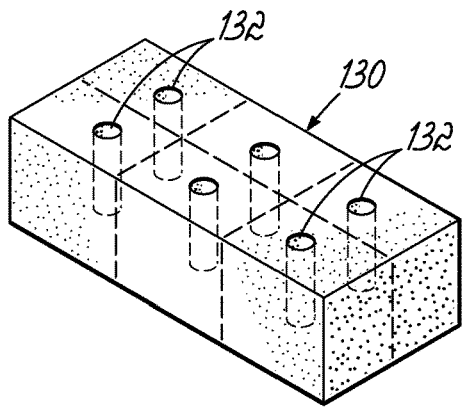
FIGS. 18-20 are respective illustrative embodiments of additional sectionable tissue sample support structures capable of being cut into multiple pieces.
Figure 19:
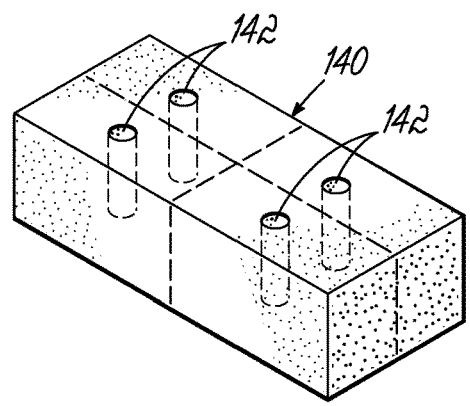
Figure 20:
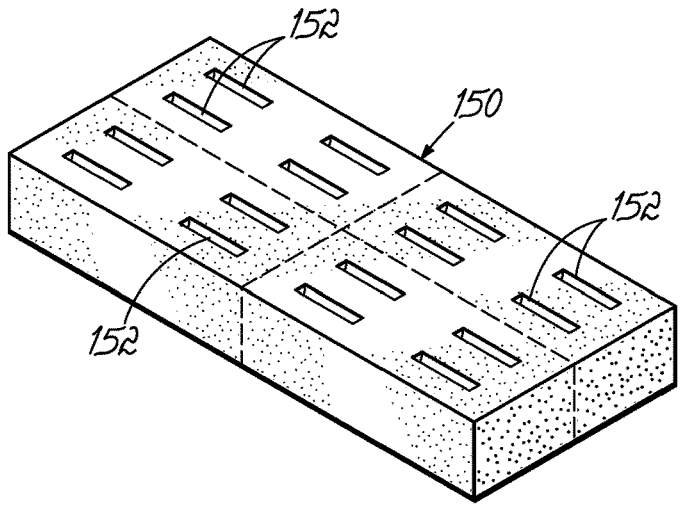

FIGS. 18, 19 and 20 illustrate further examples of gel blocks 130, 140, 150 with various types of tissue receiving spaces 132, 142, 152, and capable of being cut along the dotted lines, for example, such that the user may customize the tissue sample support structure, i.e., gel blocks 130, 140, 150, to his or her needs.

Figure 21A:
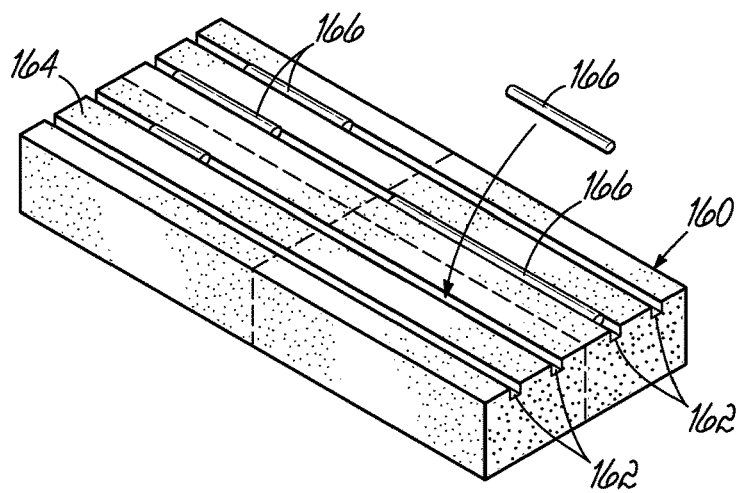
FIG. 21A is another illustrative sectionable tissue sample support structure receiving an elongate tissue sample.
Figure 21B:
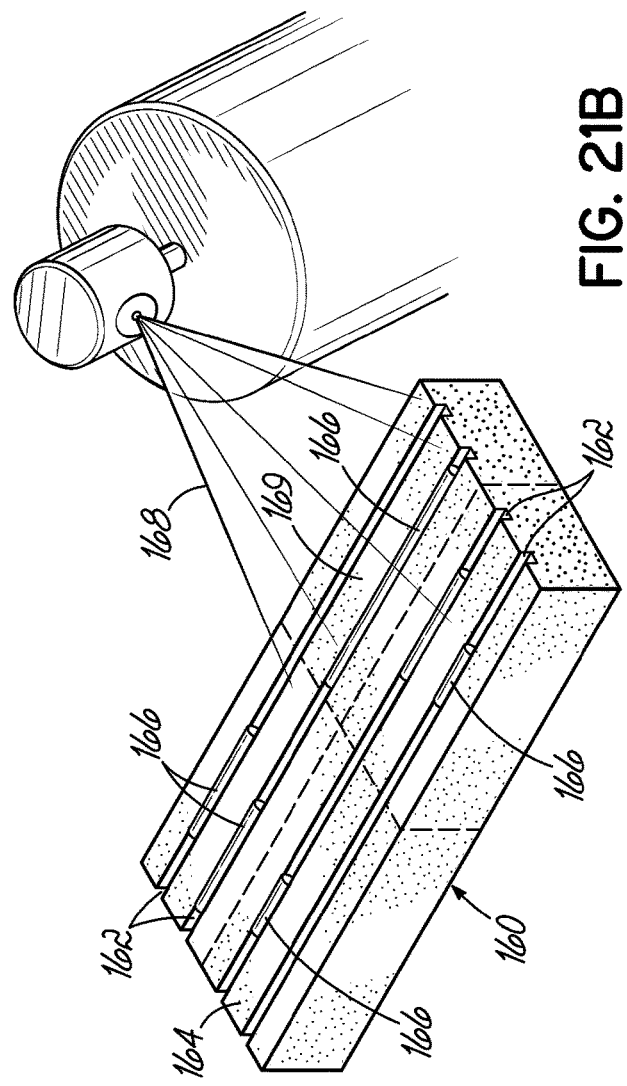
FIG. 21B is a perspective view illustrating the sectionable tissue sample support structure of FIG. 21A holding respective tissue samples and being sprayed with an adhesive containment spray for holding the tissue samples to the support structure.
Figure 21C:
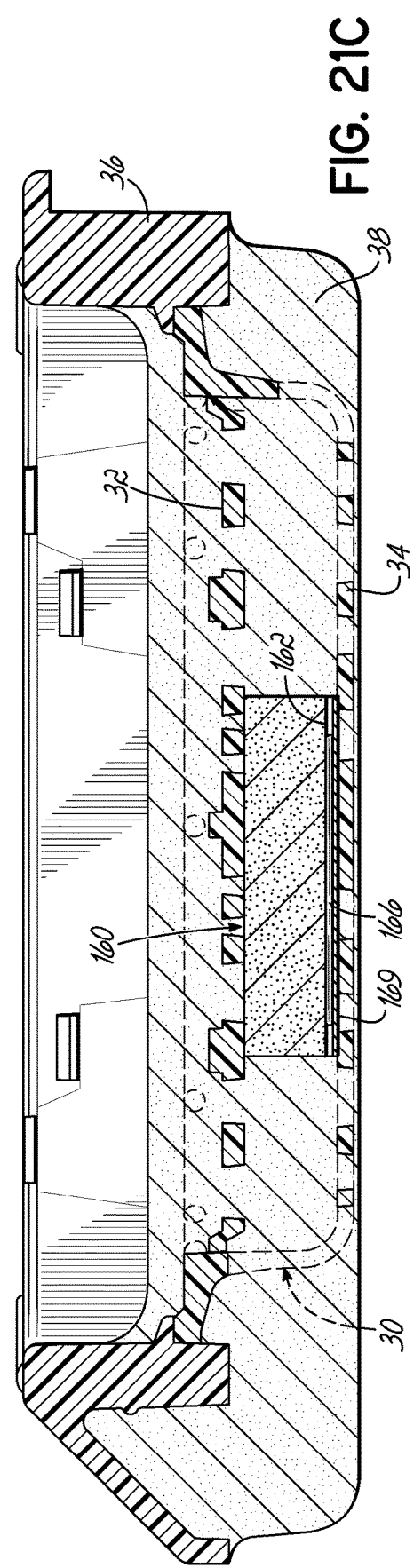
FIG. 21C is a cross sectional view similar to FIGS. 6 and 9, but illustrating use of the tissue sample support structure of FIG. 21B.

FIGS. 21A, 21B and 21C illustrate another alternative embodiment of a gel block 160 that includes elongate recesses 162 along one surface 164 for receiving thin threadlike tissue samples 166 as shown in FIG. 21A. As further shown in FIG. 21B, the surface 164, including the tissue samples 166, may be sprayed with an adhesive material 168 such that a coating 169 is formed over the surface 164 and over the tissue samples 166 such that the tissue samples 166 are retained in the recesses or grooves 162. The adhesive material 168 may be of the type described above. The gel blocks 160 with the retained tissue samples 166 are then used in the above-described manner, for example, with a sectionable tissue cassette 30 (see FIG. 6) and with the tissue samples 166 facing the bottom of the cassette, defining the microtome sectioning plane. Sections are then taken as generally described above in connection with FIG. 6.

Figure 22:
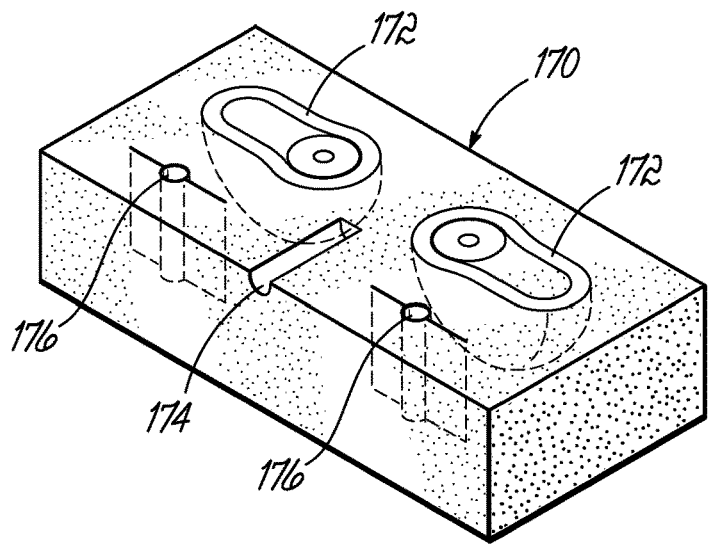
FIG. 22 is a perspective view of another sectionable tissue sample support structure constructed in accordance with an embodiment for holding various types of tissue samples.

FIG. 22 illustrates another alternative gel block 170 constructed in accordance with the invention, and including a variety of tissue receiving spaces 172, 174, 176 for holding tissues of different types and/or sizes and/or shapes.

Figure 23:
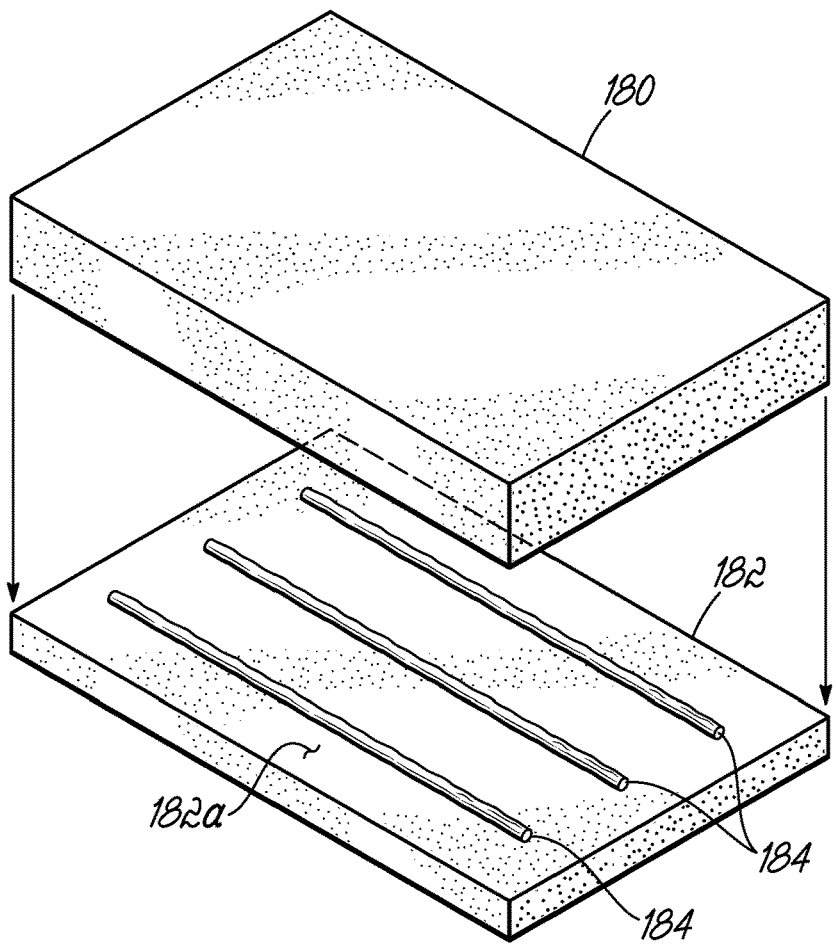
FIG. 23 is a perspective view of another sectionable tissue sample support structure constructed in accordance with an embodiment for holding various types of tissue samples.

FIG. 23 illustrates another embodiment in which two sheet forms 180, 182 of the gel compound are used to sandwich tissue samples 184 therebetween. The small, thin sheets 180, 182 of the preformed gel compound may then be embedded in paraffin and sectioned in a microtome. Preferably, at least the sheet 182 that will be sectioned first by the microtome is as thin as practical so as to minimize the number of sectioning cuts that are necessary to reach the tissue samples 184. It will be appreciated that the surface 182a carrying the tissue samples in this example defines the sectioning plane. Another benefit of the invention is realized when the gel compound structures are used to straighten or flatten tissue such that a complete and continuous tissue section is taken by the blade (not shown). For example, if the tissue samples 184 are wavy and curve out of the plane defined by the surface 182a, then the sandwiching effect of the sheet 180 when placed on top of the tissue samples 184 will straighten or flatten the samples 184 into a single plane for effective sectioning.

Figure 24:
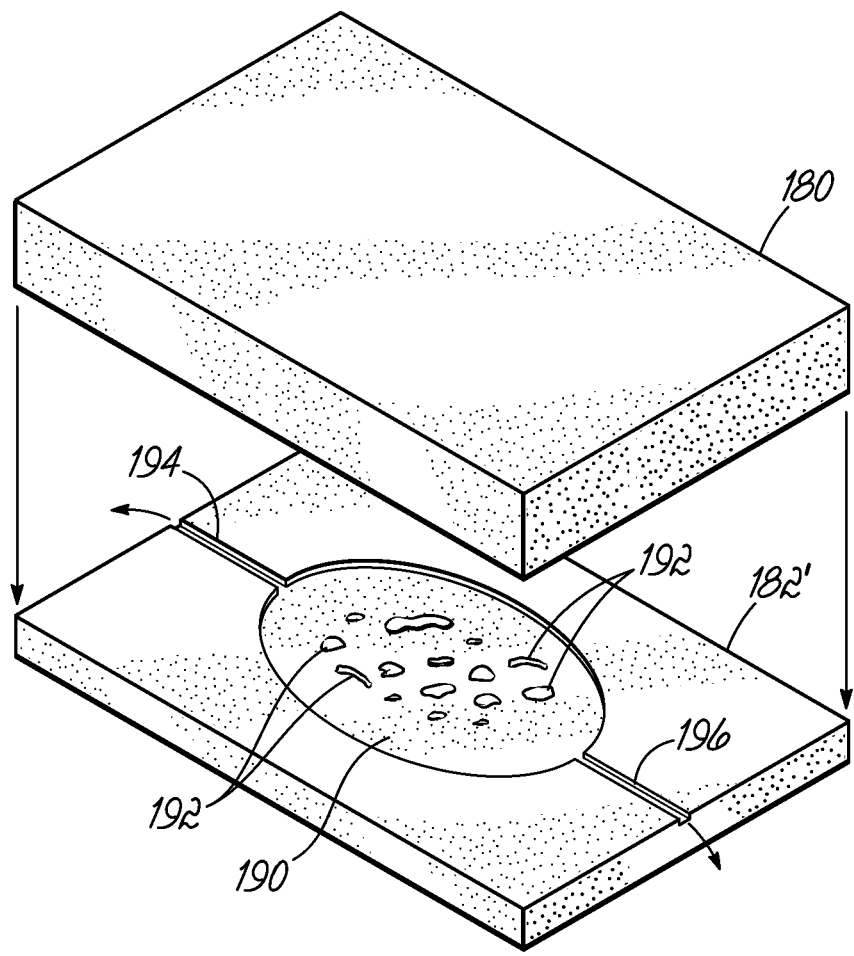
FIG. 24 is a perspective view of another sectionable tissue sample support structure constructed in accordance with an embodiment for holding various types of tissue samples.
Figure 25:
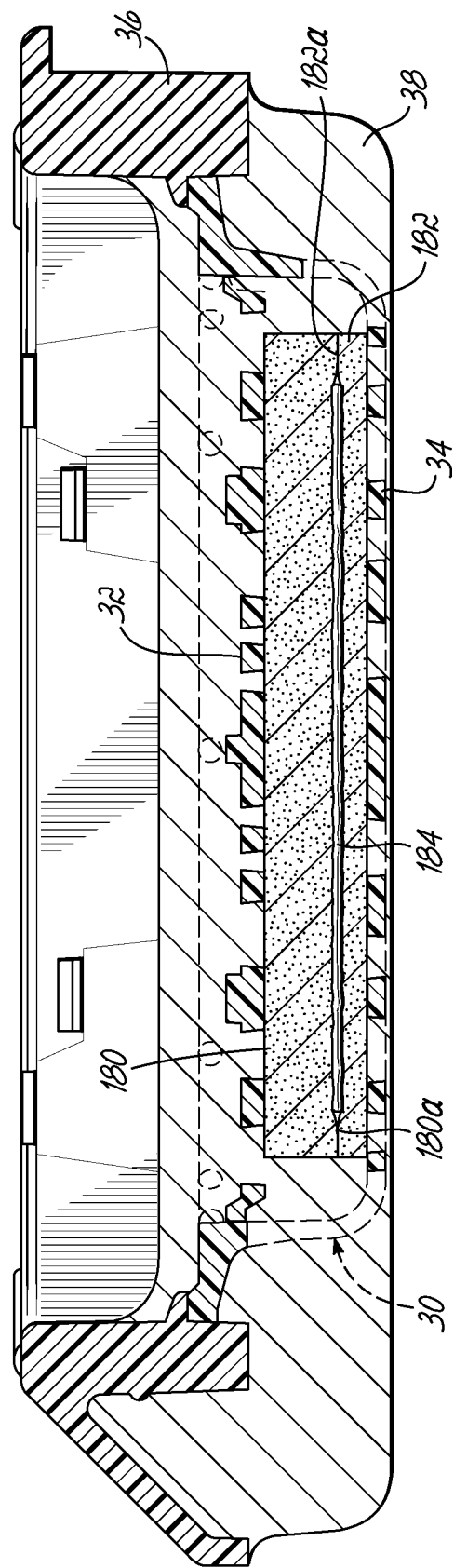
FIG. 25 is a cross sectional view similar to FIG. 6, but illustrating use of the sectionable tissue sample support structure of FIG. 23 or FIG. 24.

FIG. 24 illustrates another modification in which the sheet 182 of FIG. 23 has been slightly modified into a gel sheet 182' that includes a recess 190 for containing tissue samples 192, and further includes channels 194, 196 for expressing or draining fluid, such as formalin, in which the tissue samples 192 are stored during transport to a histology laboratory. In this regard, the histotechnician can pour the vial of fluid containing small tissue samples 192 (e.g., shavings, etc.) into the recess 190 and the fluid can drain through one or more channels 194, 196 while leaving the tissue samples 192 in the recess 190. FIG. 25 illustrates a use of the gel sheets 180, 182 or 182' in conjunction with a sectionable cassette 30, as for example, described in FIGS. 6, 12 and 21C. As with all figures, like reference numerals are used to reference like structure and function, and therefore additional description of such common subject matter is not necessary. FIG. 25 provides a clear illustration of another advantage when using a sectionable cassette 30. That is, the bottom sheet 182 prevents the tissue samples 184 from directly contacting the bottom 34 of the cassette 30. If the tissue samples 184 were to contact the bottom 34, then artifact might be introduced into the tissue samples 184 due to the discontinuities of the bottom 34 (i.e., its perforated construction). The surface 182a and the facing surface 180a will sandwich the tissue samples 184 and present a continuous section of the tissue to the microtome blade (not shown) after the bottom 34 and the sheet 182 are sectioned or "faced" off by the blade during the initial portion of the microtome process.

According to embodiments of the present invention, the gel compounds may include hydrogels, organogels, aerogels, or combinations thereof. A hydrogel is a network of polymer chains in which water is the dispersed medium. Exemplary hydrogels include, but are not limited to, silicon hydrogels, proteins based, carbohydrate based or polyol based hydrogels. An organogel is a non-crystalline, non-glassy solid material composed of a liquid organic phase entrapped in a three-dimensionally cross-linked network. Exemplary organogels include, but are not limited to Lecithin based and various dendriomer based organogels. An aerogel is a synthetic porous material in which the fluid component of the gel is air or a gas. Exemplary aerogels include, but are not limited to silica based and carbon based aerogels.

The gel compounds used for constructing the gel blocks disclosed herein may be formed in various ways, with two exemplary embodiments being provided below. According to embodiments of the invention, the gel compounds are formed from ingredients, such as macromolecules that are capable of undergoing cross-linking, cross-linking agents, preservatives, and water or other suitable solvents. Other optional ingredients include dyes, for example.

According to an embodiment of the present invention, the gel compound includes hydrogels that include cross-linked macromolecules. Accordingly, the macromolecules are capable of undergoing cross-linking. In one aspect, the macromolecules may contain a plurality of hydroxyl groups, which may react with a suitable cross-linking agent. Exemplary macromolecules include gelatin, starches such as corn starch, and agars. Other suitable macromolecules include proteins such as serum, albumen, or synthetic polymers like polylysine or polyols. Similarly, many carbohydrates (e.g., various gums, or cellulose and its derivatives) will also crosslink like corn starch. Characteristics of the gel compound may differ, particularly in shear strength. Accordingly, the formulations would have to be optimized based on selection of raw materials.

Exemplary cross-linking agents such as borax, melamine formaldehyde, sodium aluminate, or potassium tetraborate can be used to produce a gel structure. According to an embodiment, the cross-linking agent is borax.

Exemplary preservatives include antimicrobial agents, which inhibit mold growth. Suitable antimicrobial agents include methyl paraben. Other anti-microbial agents such as propyl paraben and others can be used. Without antimicrobial agents, the gel compounds may become moldy after several days.

Use of the color is optional. Number of various types of synthetic dyes or other colors can be used. According to an embodiment, a food grade aqueous color is used during the manufacturing of the gel compound. Various colors can be used as per requirements. One objective of adding color to the gel compound is to provide contrast for a technician to be able to easily see cavities made for the tissues in the gel compound block allowing for rapid insertion of the tissues into the block thereby improving the efficiency. The color may wash out during various stages of tissue processing and staining.

The gel compound further includes water. Deionized or distilled water is suitable, as is tap water. An important factor preparing the gel compound is temperature of the water. Preferably, the water should be cold (e.g., less than about 25° C.), because even lukewarm water will cause a greater degree of clumping. According to an embodiment, the temperature of the water is between about 5° C. to about 20° C., for example. Glycol type co-solvents can be used in combination with water to reduce the water content and shrinkage of the gel due to drying and/or to modify or incorporate new properties.

Sourcing of the Chemicals

Gelatin comes in different molecular weight ranges (called bloom). Scientific catalogs offer a number of ranges. These have been specially purified and sorted, so their cost is high. Grocery store gelatin is a broader range of molecular weights, but at least with name brands, has high batch-to-batch uniformity. Gelatin is readily available material that makes gel compound with very good flexibility and physical properties but gel compound made of gelatin will get stained pink by Eosin, which may make it difficult to distinguish the gel from the tissue. Any gelatin can be used, for examples below, Knox brand gelatin was used. According to one embodiment, the gelatin may be present in the gel compound in an amount ranging from about 2 wt % to about 30 wt %, based on the total weight of the gel compound.

Starch can be made from a variety of plant sources (wheat, corn, potato etc.). Corn starch is very inexpensive and readily available in consistent high quality. Starch from different suppliers or source would have different range of molecular weight, the formula can be optimize based on raw materials selected. For the examples below, Hulman & Co.'s Clabber Girl® household corn starch was used. According to one embodiment, the starch may be present in the gel compound in an amount ranging from about 2 wt % to about 30 wt %, based on the total weight of the gel compound.

Agar is a polysaccharide complex (CAS: 9002-18-0) obtained from red alga. Agar is composed of approximately 70% agarose and 30% agaropectin. Agarose is the gel forming part of agar while agaropectin is a non-gelling fraction. Agar was selected over agarose in this application due to cheaper cost of the former. Scientific catalogs offer a number of ranges and modifications of agar mainly for its use as a culture medium. Pure agarose or some of the agar products are specially purified and sorted, so their cost is high. Agar substitutes such as Phytagel™ and/or Scleroglucan type materials can be used. Regular average priced agar (Sigma Aldrich Product #A1296) was used for the examples below. According to one embodiment, the agar may be present in the gel compound in an amount ranging from about 0.1 wt % to about 15 wt %, based on the total weight of the gel compound.

Borax is sodium tetraborate. As a mineral it is commonly found as a decahydrate form, but commercially available borax may vary significantly in its degree of hydration (to improve flow and ease of solubility). Brand name (20 Mule Team), household borax was used for the examples below. The degree of hydration is critical in weighing and should be considered during formulation. According to one embodiment, the cross-linking agents may be present in the gel compound in an amount ranging from about 0.05 wt % to about 5 wt %, based on the total weight of the gel compound.

Methyl paraben is widely available from a number of suppliers. According to one embodiment, the preservatives may be present in the gel compound in an amount ranging from about 0.05 wt % to about 5 wt %, based on the total weight of the gel compound.

As described herein, a sheet of the gel compound is formed in a shallow, nonstick pan. However alternative options such as extrusion may be utilized.

Example 1

Standard Formula (Percentages are w/v Relative to Water)
Ingredient w/v Percentage 1× Formula

| Ingredient | Percentage | For 100 sq. in batch size |
| --- | --- | --- |
| Borax | 1.33 | 1.50 g |
| Gelatin | 9.33 | 10.50 g |
| Corn Starch | 9.33 | 10.5 g |
| Methyl Paraben | 1.33 | 0.15 g |
| Water | 100 | 112.50 g |

Batch Size

The Standard Formula, or 1× Formula, produces a gel approximately 2 mm thick when poured into a 100 square inch pan. For pans of different sizes and gels of different thickness, the formula may be scaled proportionally.

Preparation of the Gel Compound of Example 1

Preweighed quantities of corn starch, gelatin and methyl paraben are combined in a vessel and thoroughly mixed to minimize the formation of clumps when the water is added. CAUTION: DO NOT ADD BORAX TO THE OTHER SOLID INGREDIENTS. Cold water (e.g., less than 25° C.) is added to the mixed dry ingredients without mixing to permit the starch to hydrate for about a minute or longer. Thoroughly blend the aqueous mixture to ensure that substantially all of the corn starch, gelatin, and methyl paraben are evenly dispersed therein. Heat the aqueous mixture until it starts to boil, stirring or otherwise mixing periodically throughout the process. After which, the heating of the aqueous mixture is discontinued and the preweighed quantity of borax is added while mechanically mixing for a few seconds until the borax is completely dispersed.

Working as fast as possible, the resultant material is poured into a shallow, non-stick pan. The pan is tilted in all directions to get the material to flow into all corners and edges, then the pan is set down level and gravity is allowed to bring the material to uniform thickness. The pan is covered with plastic wrap and the material is allowed to cool to room temperature without moving to form a sheet of gel compound. After 2 or more hours, the sheet of gel compound is removed from the pan in one piece. For example, the sheet may be removed from the pan by prying it up along one edge with a spatula or similar device, then pulling it up and out. The sheet of gel compound is placed on a smooth piece of plastic wrap and cut. The gel is cut into 12×18 mm blocks (or in required size). Slits or holes desired for supporting specific tissue shapes are then created in the blocks. Required shape and cavities for supporting tissues can be achieved using molds during processing or by die cutting post manufacturing.

Chemical Explanation:

Gelatin produces a strong gel when processed properly. In hydrated form at room temperature, its molecules are tightly wrapped balls that do not interact with each other (or with other ingredients), minimizing clumping. The dispersion is somewhat viscous but will not gel as is. As temperature is raised to the boiling point, the molecules unwrap and become long, tangled strings. Upon cooling, they retain the tangled conformation and become a sponge-like mass entrapping water. A pure gelatin dispersion is reversibly gel-like or liquid, depending upon the temperature.

Corn starch is also a macromolecule with similarities to gelatin. It tends to clump badly when put into cold water because of strong interactions between adjacent molecules. When dry, starch and gelatin particles stick to one another and minimize starch-starch interactions during hydration, hence the need to mix dry ingredients together. Like gelatin, starch molecules unwind at higher temperature and form a soft gel upon cooling. Starch is used as a thickener, but at high concentrations, it forms a gel with little shear strength. The function of starch in the gel is to provide reactive hydroxyl groups for crosslinking.

Borax is a crosslinking agent that reacts with the hydroxyl groups found in carbohydrates like starch. Crosslinking makes the gelling irreversible. The reaction is rapid initially, so the gel must be poured immediately after incorporating borax into the mixture.

Borax and starch alone will produce a permanent gel, but a combination of the two was used to obtain physical properties such as shear strength required in the purposes in this application.

Example 2

Standard Formula (Percentages are w/w)
Ingredient w/w Percentage 1× Formula

| Material | Percentage | For 100 sq. in batch size |
|---|---|---|
| Agar or agarose | 2.00 | 2.70 g |
| Borax | 0.50 | 0.68 g |
| Corn Starch | 3.00 | 4.05 g |
| D.I. Water | 94.30 | 127.30 g |
| Food grade dye | 0.05 | 0.07 g |
| Methyl Paraben | 0.15 | 0.20 g |

Batch Size

The standard batch size produces a gel approximately 2 mm thick when poured into a 100 square inch pan. For using pans of different sizes or obtaining gels of different thickness, the formula should be scaled up or down proportionally.

Preparation of the Gel Compound of Example 2:

Weight of empty container to be used for making the gel is measured and recorded. Preweighed quantities of corn starch, agar and methyl paraben are combined in the container and thoroughly mixed to minimize the formation of clumps when the water is added. CAUTION: BORAX MUST NOT BE ADDED TO THE OTHER DRY INGREDIENTS. Cold water (e.g., less than 25° C.) is added. The aqueous mixture is thoroughly blended to ensure that substantially all of the corn starch, gelatin, and methyl paraben are evenly dispersed therein. Food grade dye of the desired color is added to the aqueous mixture and mixed well to disperse dye and to provide a homogeneous color to the mixture. The aqueous mixture is heated until it starts to boil, stirring or otherwise mixing periodically throughout the process. After which, the heating of the aqueous mixture is discontinued. The container and its contents are weighed. If necessary, water is added and mixed to replenish and compensate for water loss in formulation due to evaporation. The preweighed quantity of borax is added and the aqueous mixture is stirred for a few seconds until the borax is completely dispersed/dissolved.

Working as fast as possible, the resultant material is poured into a shallow, non-stick pan. The pan is tilted in all directions to get the material to flow into all corners and edges, then the pan is set down level and gravity is allowed to bring the material to uniform thickness. The pan is covered with plastic wrap and the material is allowed to cool to room temperature without moving to form a sheet of gel compound. After providing adequate gelling time, the sheet of gel compound is removed from the pan in one piece. For example, the sheet may be removed from the pan by prying it up along one edge with a spatula or similar device, then pulling it up and out. The sheet of gel compound is placed on a smooth piece of plastic wrap and cut. The gel is cut into 12×18 mm blocks (or in required size). Slits or holes desired for supporting specific tissue shapes are carefully created in the gel block. Required shape and cavities for supporting tissues can be achieved using molds during processing or by die cutting post manufacturing.

Chemical Explanation

Agar (or agarose) produces a strong gel when processed properly. In a dry powder form, its molecules are tightly wrapped particles that do not interact with each other (or with other ingredients), minimizing clumping. Its water dispersion is somewhat viscous but not a gel. As temperature is raised to the boiling point, the molecules unwrap and become long, tangled strings. Upon cooling, they retain the tangled conformation and become a sponge-like mass entrapping water. A pure agar (or agarose) dispersion makes a reversible gel with physical properties and stability depending upon the temperature.

Corn starch is also a macromolecule with similarities to agar. However, it tends to clump badly when put into water because of strong interactions between adjacent molecules. When dry, starch and agar particles stick to one another and minimize starch-starch interactions during hydration, hence the need for mixing the dry ingredients together prior to hydration. Like agar, starch molecules unwind at higher temperature and form a soft gel upon cooling. Starch is used as a thickener, but at high concentrations, it forms a gel with little shear strength. Its function in the gel compound described herein is to provide reactive hydroxyl groups for crosslinking and optimize physical properties of the gel.

Borax is the crosslinking agent that reacts with the hydroxyl groups found in carbohydrates like starch or agar. Crosslinking permanently solidifies the gel. The reaction is rapid initially, so the gel must be poured rapidly after incorporating borax into the mixture.

Borax and either agar or starch alone will produce a permanent gel, but these binary compositions (borax/agar or borax/starch) are used to obtain physical properties such as shear strength required for the purposes of this application.

Agar is an important component in the embodiments described herein. One of the preferred reasons for using of agar over other gel forming materials such as gelatin is that agar does not get stained by Eosin. Hence during microscopic evaluation the tissues can be very easily distinguished from surrounding gel.

Methyl paraben is an antimicrobial agent. Without it, gels become moldy after several days.

Water is the largest component of this formulation. Deionized or distilled is suitable, as is tap water. An important factor in preparing the gel compound is temperature of the water. Preferably, the water should be cold (e.g., less than about 25° C.), because even lukewarm water will cause a greater degree of clumping. The water should be cold when first added into starch-agar mixture, because warm water will cause a greater degree of clumping of the corn starch, which makes the initial mixing difficult.

Variations in Manufacturing Process

Order of addition of initial dry materials (e.g., agar, corn starch and methyl paraben), as well as water, can be changed as per comfort of manufacturing process.

Materials can be heated in a conventional manner or using microwaves. It has been found that microwave heating is especially suitable for heating small batches. More specifically, it has been observed that the time for heating reduces significantly and more homogeneous heating is obtained with without material settling and sticking to the bottom of the container.

Variation in proportions of raw materials like agar, corn starch, borax, water, etc. may affect the physical properties of the gel to differing degrees. However, a gel with workable physical properties can be obtained over a considerable range of reactants. The formulations presented in Examples 1 and 2 have been found to provide improved batch to batch consistency under the described manufacturing processes.

While the present invention has been illustrated by the description of one or more embodiments thereof, and while the embodiments have been described in considerable detail, they are not intended to restrict or in any way limit the scope of the appended claims to such detail. The various features as described herein may be used in the described combinations or in any combination according to the needs of the user. Additional advantages and modifications will readily appear to those skilled in the art. The invention in its broader aspects is therefore not limited to the specific details, representative apparatus and method and illustrative examples shown and described. Accordingly, departures may be from such details without departing from the scope or spirit of the general inventive concept.

What is claimed is:

1. A method of orienting, processing, embedding and microtome slicing a tissue sample using a gel compound preformed into a three dimensional, self-supporting and preformed gel block having a predetermined geometric shape defined by an outer boundary for retention and orientation of at least one tissue sample during a histopathology process including processing, embedding and microtome slicing of the tissue sample, the gel block being sectionable by a microtome to form sections of the gel block and tissue sample, the gel block including a tissue sample receiving space formed in a portion of the three dimensional, self-supporting and preformed gel block, the tissue sample receiving space extending within the outer boundary of the gel block and configured to retain and orient the tissue sample, the method comprising:

removing the preformed gel block from a package enclosing the gel block under clean, moisture-proof conditions;

retaining the tissue sample in a desired orientation in the tissue sample receiving space;

processing the tissue sample while in the desired orientation by subjecting the tissue sample and the preformed gel block to processing fluids and reagents;

embedding the preformed gel block and the tissue sample while in the desired orientation in an embedding media to form a microtome sectionable block of the embedding media, the tissue sample and the preformed gel block; and microtome sectioning the microtome sectionable block to obtain the sections of the tissue sample for diagnosis.

2. The method of claim 1, wherein retaining the tissue sample further comprises retaining the tissue sample between resiliently deformable portions of the preformed gel block.

3. The method of claim 1, wherein retaining the tissue sample further comprises retaining the tissue sample in a through hole formed in the preformed gel block and applying force to the tissue sample with the gel block.

4. The method of claim 1, further comprising:

securing the preformed gel block and the retained tissue sample on a microtome sectionable tissue support structure at least prior to the embedding and microtome sectioning steps; and microtome sectioning the tissue support structure before the step of microtome sectioning the microtome sectionable block.

5. The method of claim 4, wherein the microtome sectionable tissue support structure further comprises a cassette including first and second portions, and the method further comprises:

securing the gel block and the retained tissue sample between the first and second portions of the cassettes; and microtome sectioning through at least one of the first or second portions.

6. The method of claim 1, wherein retaining the tissue further comprises using an adhesive to secure the tissue sample to the gel block.

\* \* \* \* \*